US012783461B2

(12) United States Patent
Khilko et al.

(10) Patent No.: US 12,783,461 B2
(45) Date of Patent: Nov. 3, 2026

(54) ASYNCHRONOUS REPLICATION VIA FILE-ORIENTED SNAPSHOTS

(71) Applicant: Nutanix, Inc., San Jose, CA (US)

(72) Inventors: Andrey Khilko, Redwood City, CA (US); Kalpesh Bafna, Fremont, CA (US); Manoj Premanand Naik, San Jose, CA (US); Sanath Kumar Kalligundi Shivaswamy, Sunnyvale, CA (US); Trimbak Bardale, Maharashtra (IN); Suhrud Patankar, Maharashtra (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/379,058

(22) Filed: Oct. 11, 2023

(65) Prior Publication Data

US 2025/0061085 A1 Feb. 20, 2025

(30) Foreign Application Priority Data

Aug. 15, 2023 (IN) ............................ 202341054723

(51) Int. Cl.

| | |
|---|---|
| ***G06F 16/11*** | (2019.01) |
| ***G06F 16/174*** | (2019.01) |
| ***G06F 16/178*** | (2019.01) |
| ***G06F 16/182*** | (2019.01) |
| ***G06F 16/188*** | (2019.01) |

(52) U.S. Cl.
CPC ........ *G06F 16/128* (2019.01); *G06F 16/1756* (2019.01); *G06F 16/178* (2019.01); *G06F 16/184* (2019.01)

(58) Field of Classification Search
CPC .. G06F 16/128; G06F 16/1756; G06F 16/184; G06F 16/178; G06F 16/188
See application file for complete search history.

(56) References Cited

U.S. PATENT DOCUMENTS

| | | | |
|---|---|---|---|
| 7,149,982 | B1 | 12/2006 | Duperrouzel |
| 8,549,518 | B1 | 10/2013 | Aron et al. |
| 8,601,473 | B1 | 12/2013 | Aron et al. |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Charles Rones
*Assistant Examiner* — Mohammad S Bhuyan
(74) *Attorney, Agent, or Firm* — Cesari and McKenna, LLP

(57) ABSTRACT

A replication policy management and scheduling technique of a Files service is configured for deployment in multi-site data replication environments. The technique involves policy management for data distribution and/or data consolidation (concentration) where multiple sources, e.g., file system (FS) clusters or sites, replicate the data to a central target FS site, e.g., in a spoke and hub arrangement typical of remote office/branch office environments. The technique also involves creation and configuration of a main replication policy by a customer at a central resource manager configured to interact and manage the FS sites, each of which includes one or more file server virtual machines.

33 Claims, 9 Drawing Sheets

(56) References Cited

U.S. PATENT DOCUMENTS

| | | | | |
|---|---|---|---|---|
| 8,850,130 | B1 | 9/2014 | Aron et al. | |
| 8,863,124 | B1 | 10/2014 | Aron et al. | |
| 9,009,106 | B1 | 4/2015 | Aron et al. | |
| 9,069,708 | B2 | 6/2015 | Gill et al. | |
| 9,336,132 | B1 | 5/2016 | Aron et al. | |
| 9,652,265 | B1 | 5/2017 | Narayanasamy et al. | |
| 9,747,287 | B1 | 8/2017 | Bhardwaj et al. | |
| 9,772,866 | B1 | 9/2017 | Aron et al. | |
| 10,409,687 | B1 * | 9/2019 | Bono | G06F 11/1451 |
| 10,496,601 | B1 * | 12/2019 | Natanzon | G06F 16/188 |
| 11,132,267 | B1 * | 9/2021 | Mathew | G06F 11/1451 |
| 11,436,097 | B1 | 9/2022 | Kumar et al. | |
| 11,575,745 | B2 | 2/2023 | Tatiparthi et al. | |
| 2003/0182313 | A1 * | 9/2003 | Federwisch | G06F 16/10 714/E11.107 |
| 2008/0133622 | A1 | 6/2008 | Brown | |
| 2013/0054530 | A1 * | 2/2013 | Baker | G06F 16/119 707/639 |
| 2014/0344222 | A1 * | 11/2014 | Morris | G06F 16/1844 707/634 |
| 2014/0365437 | A1 * | 12/2014 | Srinivasan | G06F 16/27 707/634 |
| 2016/0019317 | A1 * | 1/2016 | Pawar | G06F 16/128 707/649 |
| 2016/0259574 | A1 * | 9/2016 | Carpenter | G06F 3/0619 |
| 2016/0259809 | A1 * | 9/2016 | Diederich | G06F 16/178 |
| 2017/0060702 | A1 * | 3/2017 | Dave | G06F 11/2094 |
| 2018/0181637 | A1 | 6/2018 | Freiberg | |
| 2019/0339870 | A1 | 11/2019 | Meiri | |
| 2020/0034051 | A1 | 1/2020 | Zhang | |
| 2020/0134052 | A1 | 4/2020 | Natanzon | |
| 2020/0192912 | A1 | 6/2020 | Mitkar | |
| 2020/0201716 | A1 | 6/2020 | Katoch | |
| 2021/0279244 | A1 | 9/2021 | Patel | |
| 2021/0405878 | A1 | 12/2021 | Kumar | |
| 2022/0147541 | A1 * | 5/2022 | Mallipeddi | G06F 3/067 |
| 2022/0374316 | A1 | 11/2022 | Kumar | |
| 2022/0374519 | A1 * | 11/2022 | Botelho | G06F 11/1464 |
| 2022/0398163 | A1 | 12/2022 | Bezbaruah et al. | |
| 2023/0153325 | A1 * | 5/2023 | Ceesay | G06N 7/01 707/610 |
| 2023/0359585 | A1 * | 11/2023 | George | G06F 16/125 |
| 2023/0409522 | A1 * | 12/2023 | Kashi Visvanathan | G06F 16/185 |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https://nutanixbible.com/, dated Aug. 17, 2023, 266 pages.

VMware Manual—vCenter Server and Host Management, Update 1, VMware vSphere 7.0, VMware ES, Xi 7.0, vCenter Server 7.0, Modified on Nov. 25, 2020, 203 pages.

* cited by examiner

ASYNCHRONOUS REPLICATION VIA FILE-ORIENTED SNAPSHOTS

CROSS-REFERENCE TO RELATED APPLICATION

The present application claims the benefit of India Provisional Patent Application Ser. No. 202341054723, which was filed on Aug. 15, 2023, by Andrey Khilko, et al. for ASYNCHRONOUS REPLICATION VIA FILE-ORIENTED SNAPSHOTS, which is hereby incorporated by reference.

The present application is related to U.S. patent application Ser. No. 18/379,109, filed on Oct. 11, 2023, by Andrey Khilko et al, entitled REPLICATION POLICY MANAGEMENT AND SCHEDULING TECHNIQUE OF A FILES SERVICE, identified by Cesari and McKenna Filed No. 112082-0037/PAT-1434, the contents of which are hereby incorporated by reference.

BACKGROUND

Technical Field

The present disclosure relates to data replication and, more specifically, to data replication of high-level logical constructs, such distributed shares, in a multi-site data replication environment.

Background Information

Data replication generally involves copying or replicating data among multiple datacenters to enable continued operation of data processing operations in a multi-site data replication environment, such as backup. As used herein, the multi-site data replication environment includes two or more datacenters, i.e., sites, which are often geographically separated by relatively large distances and connected over a communication network, e.g., a wide area network. A client may desire replication of data of a high-level logical construct, such as a share of a volume, from one or more remote datacenters (source sites) over the network to a local datacenter (target site) located at geographically separated distances to ensure backup of the data. Typically, the replication involves transfer of a base snapshot from the source sites to the target site and then sending incremental changes thereafter for the entire share, even when only a fraction of the share, e.g., a particular subdirectory of the share, may be of interest, leading to needless transfer of data. In addition, control of specific synchronization, such as application of deletions and overwrites on a per-file-basis, is not possible as the incremental changes apply only to blocks for the entire share or volume. This is exacerbated when managing replication for a volume with a large number of underlying shares that would each involve a separate replication.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique configured to enable asynchronous replication of a high-level construct (e.g., distributed home share, top level directory (TLD) or file) via file-oriented snapshots driven by incremental block-level snapshot changes. Asynchronous replication for incremental snapshots is based on file system level (vs block level) snapshots of the high-level construct that are generated using change file tracking from block-level snapshot differences (deltas) and screened by customer-provided filters. File/directory (TLD) changes are dynamically mapped and executed by incremental replication jobs. The technique also involves creation and maintenance of a replay list for files failing replication where the failed files may be replicated during a next incremental replication cycle of periodically scheduled incremental replication jobs. A replicator, e.g., a replication process, is configured to employ the block-level snapshot deltas to drive directory/file level changes for replication according to the customer-provided filters at the file system level.

Description

Figure 1:
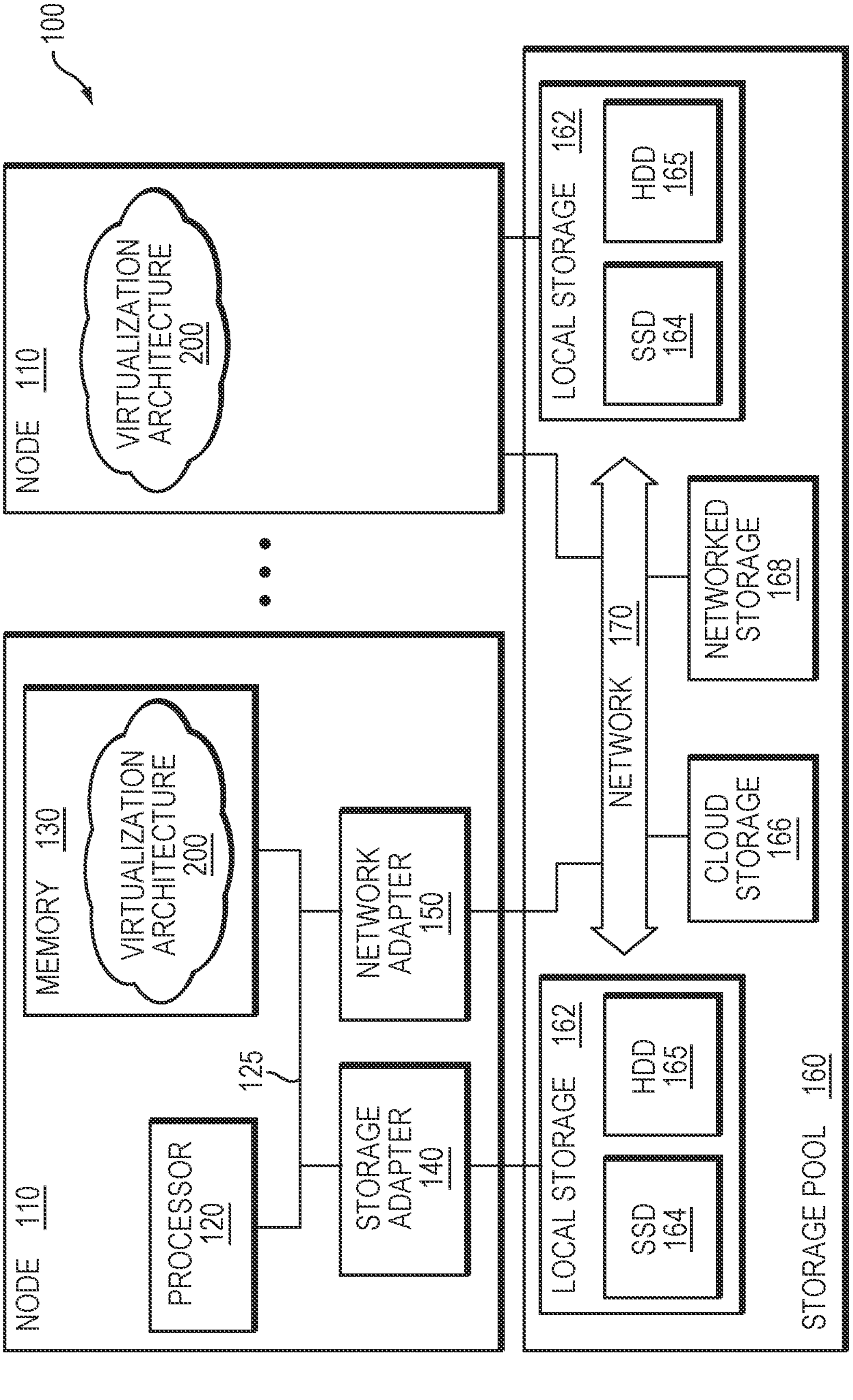
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage items, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be affected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, while other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include processes that may spawn and control a plurality of threads (i.e., the process creates and controls multiple threads), wherein the code, processes, threads, and programs may be embodied as logic, components, and/or modules consisting of hardware, software, firmware, or combinations thereof.

Figure 2:
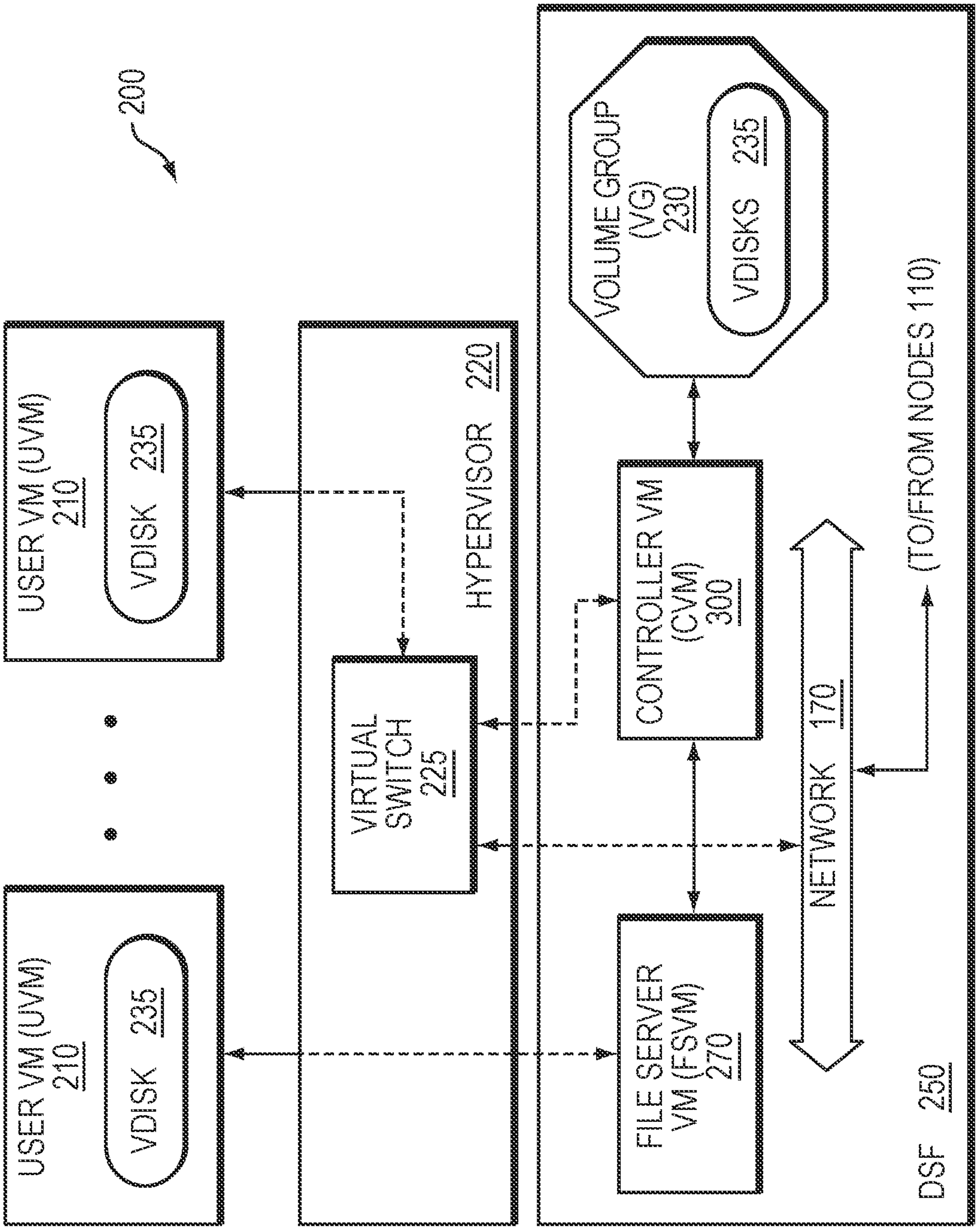
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. That is, the UVMs 210 may run one or more applications that operate as "clients" with respect to other components and resources within virtualization environment providing services to the clients. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed data processing system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

A file server virtual machine (FSVM) 270 is a software component that provides file services to the UVMs 210 including storing, retrieving, and processing I/O data access operations requested by the UVMs 210 and directed to information stored on the DSF 250. To that end, the FSVM 270 implements a file system (e.g., a Unix-like inode based file system) that is virtualized to logically organize the information as a hierarchical structure (i.e., a file system hierarchy) of named directories and files on, e.g., the storage devices ("on-disk"). The FSVM 270 includes a protocol stack having network file system (NFS) and/or Common Internet File system (CIFS) (and/or, in some embodiments, server message block, SMB) processes that cooperate with the virtualized file system to provide a Files service, as described further herein. The information (data) stored on the DFS may be represented as a set of storage items, such as files organized in a hierarchical structure of folders (directories), which can contain files and other folders, as well as shares and exports. Illustratively, the shares (CIFS) and exports (NFS) encapsulate file directories, which may also contain files and folders.

In an embodiment, the FSVM 270 may have two IP (network) addresses: an external IP (service) address and an internal IP address. The external IP service address may be used by clients, such as UVM 210, to connect to the FSVM 270. The internal IP address may be used for iSCSI communication with CVM 300, e.g., between FSVM 270 and CVM 300. For example, FSVM 270 may communicate with storage resources provided by CVM 300 to manage (e.g., store and retrieve) files, folders, shares, exports, or other storage items stored on storage pool 160. The FSVM 270 may also store and retrieve block-level data, including block-level representations of the storage items, on the storage pool 160.

The client software (e.g., applications) running in the UVMs 210 may access the DSF 250 using filesystem protocols, such as the NFS protocol, the SMB protocol, the common internet file system (CIFS) protocol, and the internet small computer system interface (iSCSI) protocol. Operations on these filesystem protocols are interposed at the hypervisor 220 and forwarded to the FSVM 270, which cooperates with the CVM 300 to perform the operations on data stored on local storage 162 of the storage pool 160. The CVM 300 may export one or more iSCSI, CIFS, or NFS targets organized from the storage items in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, SMB, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the vdisks 235 may be organized into one or more volume groups (VGs), wherein each VG 230 may include a group of one or more storage devices that are present in local storage 162 associated (e.g., by iSCSI communication) with the CVM 300. The one or more VGs 230 may store an on-disk structure of the virtualized file system of the FSVM 270 and communicate with the virtualized file system using a storage protocol (e.g., iSCSI). The "on-disk" file system may be implemented as a set of data structures, e.g., disk blocks, configured to store information, including the actual data for files of the file system. A directory may be implemented as a specially formatted file in which information about other files and directories are stored.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 260. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
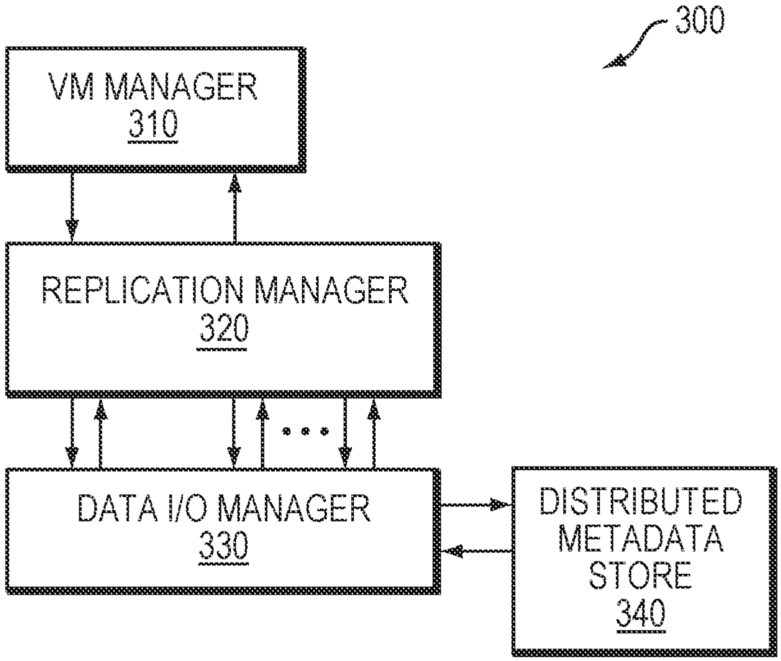
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as services of a storage stack running in a user space of the operating system of the CVM to provide storage and I/O management services within DSF 250. The processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320 is configured to provide replication capabilities of DSF 250. Such capabilities include migration of virtual machines and storage containers, as well as scheduling of snapshots. A data I/O manager 330 is responsible for all data management and I/O operations in DSF 250 and provides a main interface to/from the hypervisor 220. e.g., via the IP-based storage protocols. Illustratively, the data V/O manager 330 presents a vdisk 235 to the UVM 210 in order to service I/O access requests by the UVM to the DFS. In an embodiment, the data I/O manager 330 may interact with a replicator process of the FSVM 270 to replicate full and periodic snapshots, as described herein. A distributed metadata store 340 stores and manages all metadata in the node/cluster, including metadata structures that store metadata used to locate (map) the actual content of vdisks on the storage devices of the cluster.

Operationally, a client (e.g., UVM 210) may send an I/O request (e.g., a read or write operation) to the FSVM 270 (e.g., via the hypervisor 220) and the FSVM 270 may perform the operation specified by the request. The FSVM 270 may present a virtualized file system to the UVM 210 as a namespace of mappable shared drives or mountable network filesystems of files and directories. The namespace of the virtualized filesystem may be implemented using storage devices of the storage pool 160 onto which the shared drives or network filesystems, files, and folders, exports, or portions thereof may be distributed as determined by the FSVM 270. The FSVM 270 may present the storage capacity of the storage devices as an efficient, highly available, and scalable namespace in which the UVMs 210 may create and access shares, exports, files, and/or folders. As an example, a share or export may be presented to a UVM 210 as one or more discrete vdisks 235, but each vdisk may correspond to any part of one or more virtual or physical disks (storage devices) within storage pool 160. The FSVM 270 may access the storage pool 160 via the CVM 300. The CVM 300 may cooperate with the FSVM 270 to perform I/O requests to the storage pool 160 using local storage 162 within the same node 110, by connecting via the network 170 to cloud storage 166 or networked storage 168, or by connecting via the network 170 to local storage 162 within another node 110 of the cluster (e.g., by connecting to another CVM 300).

Figure 4:
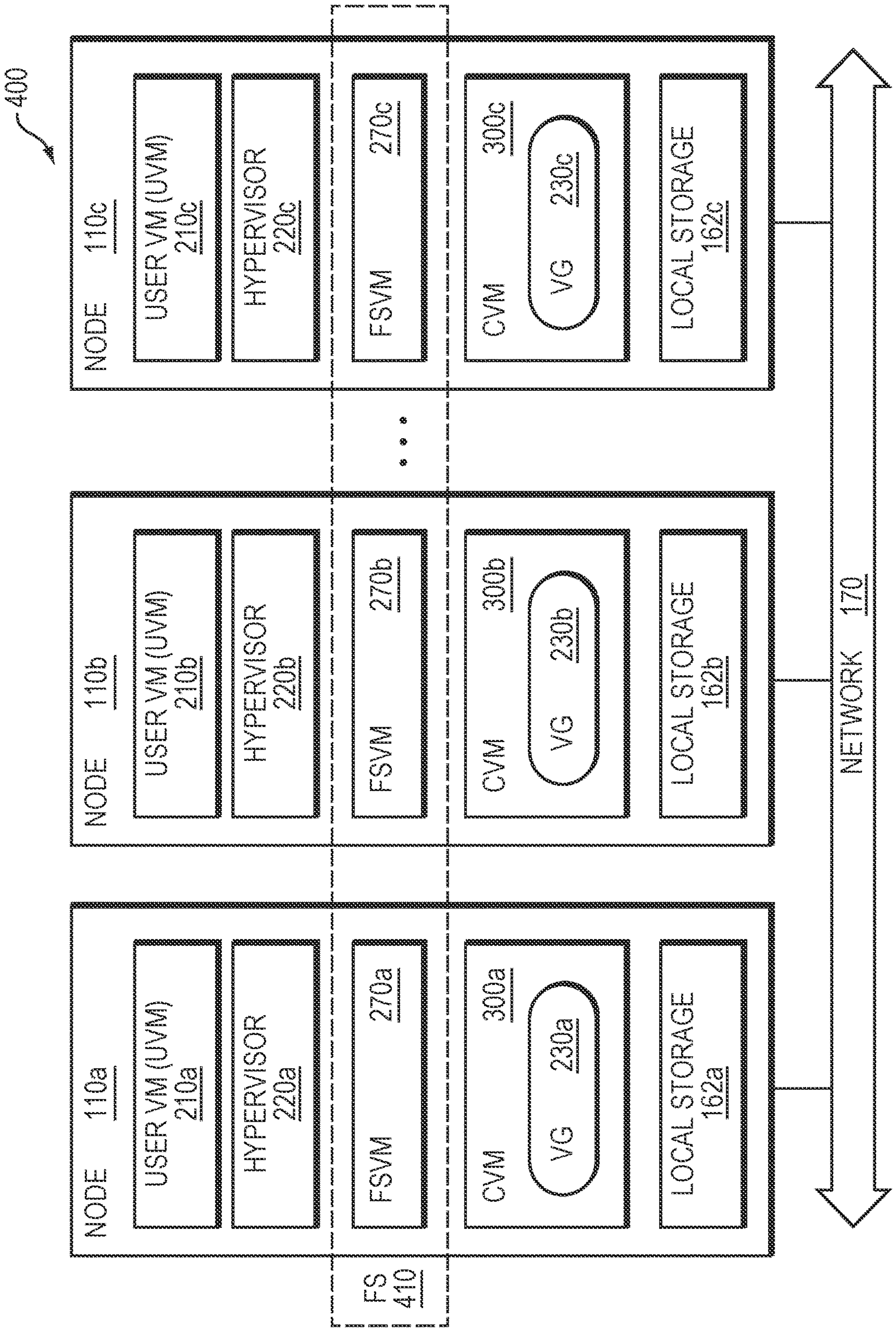
FIG. 4 is a block diagram of a virtualized cluster environment implementing a File Server (FS) configured to provide a Files service.

In an embodiment, the Files service provided by the virtualized file system of the FSVM 270 implements a software-defined, scale-out architecture that provides file services to clients through, e.g., the CIFS and NFS filesystem protocols provided by the protocol stack of FSVM 270. The architecture combines one or more FSVMs 270 into a logical file server instance, referred to as a File Server, within a virtualized cluster environment. FIG. 4 is a block diagram of a virtualized cluster environment 400 implementing a File Server (FS) 410 configured to provide the Files service. As noted, the FS 410 provides file services to user VMs 210, which services include storing and retrieving data persistently, reliably, and efficiently. In one or more embodiment, the FS 410 may include a set of FSVMs 270 (e.g., three FSVMs 270*a-c*) that execute on host machines (e.g., nodes 110*a-c*) and process storage item access operations requested by user VMs 210*a-c* executing on the nodes 210*a-c*. Illustratively, one FSVM 270 is stored (hosted) on each node 110 of the computing node cluster 100, although multiple FSs 410 may be created on a single cluster 100. The FSVMs 270*a-c* may communicate with storage controllers provided by CVMs 300*a-c* executing on the nodes 210*a-c* to store and retrieve files, folders, shares, exports, or other storage items on local storage 162*a-c* associated with, e.g., local to, the nodes 201*a-c*. One or more VGs 230*a-c* may be created for the FSVMs 270*a-c*, wherein each VG 230 may include a group of one or more available storage devices present in local storage 162 associated with (e.g., by iSCSI communication) the CVM 300. As noted, the VG 230 stores an on-disk structure of the virtualized file system to provide stable storage for persistent states and events. During a service outage, the states, storage, and events of a VG 230 may failover to another FSVM 270.

Shares

In an embodiment, the Files service provided by the virtualized file system of the FSVM 270 includes two types of shares or exports (hereinafter "shares"): a distributed share and a standard share. A distributed ("home") share load balances access requests to user data in a FS 410 by distributing root or top-level file directories (TLDs) across the FSVMs 270 of the FS 410, e.g., to improve performance of the access requests and to provide increased scalability of client connections. In this manner, the FSVMs effectively distribute the load for servicing connections and access requests. Illustratively, distributed shares are available on FS deployments having three or more FSVMs 270. In contrast, all of the data of a standard ("general purpose") share is directed to a single FSVM, which serves all connections to clients. That is, all of the TLDs of a standard share are managed by a single FSVM 270.

Figure 5:
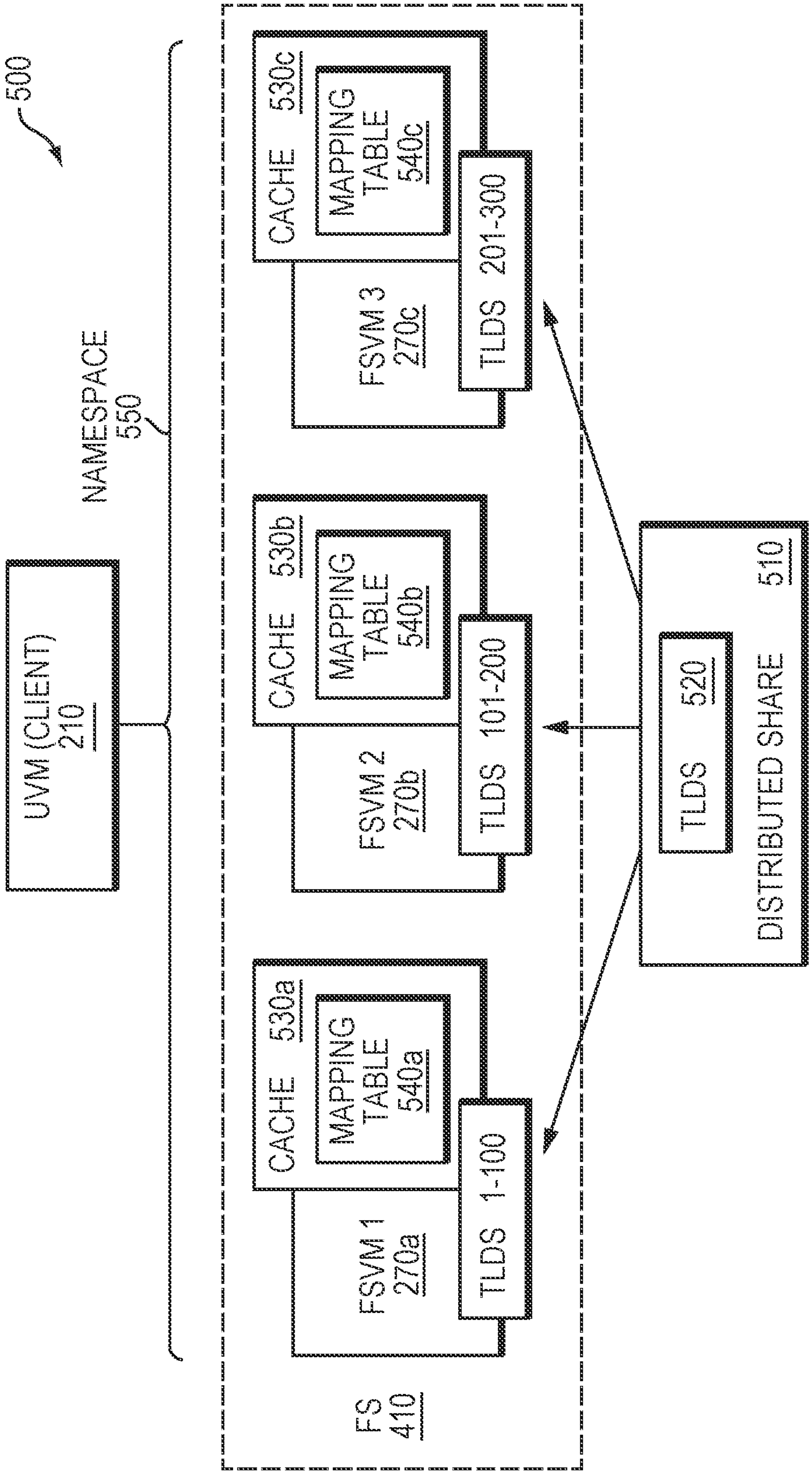
FIG. 5 is a block diagram illustrating distribution of a high-level construct embodied as a distributed share across the FS.

FIG. 5 is a block diagram illustrating distribution of a high-level construct embodied as a distributed share across the FS. Assume the distributed share 510 includes three hundred (300) TLDs 520 distributed and managed among three (3) FSVMs1-3 270*a-c* of FS1 410, e.g., FSVM1 manages TLDs1-100, FSVM2 manages TLDs101-200, and FSVM3 manages TLDs201-300. In one or more embodiments, FSVMs 1-3 cooperate to provide a single namespace 550 of the TLDs for the distributed share 510 to UVM 210 (client), whereas each FSVM1-3 is responsible for managing a portion (e.g., 100 TLDs) of the single namespace 550 (e.g., 300 TLDs). The client may send a request to connect to a network (service) address of any FSVM1-3 of the FS 410 to access one or more TLDs 520 of the distributed share 510.

In an embodiment, a portion of memory 130 of each node 110 may be organized as a cache 530 that is distributed among the FSVMs 270 of the FS 410 and configured to maintain one or more mapping data structures (e.g., mapping tables 540) specifying locations (i.e., the FSVM) of each of the TLDs 520 of the distributed share 510. That is, the mapping tables 540 associate nodes for FSVM1-3 with the TLDs 520 to define a distributed service workload among the FSVMs (i.e., the nodes executing the FSVMs) for accessing the FS 410. If the client request to access a particular TLD (e.g., TLD150) of the distributed share 520 is received at a FSVM (e.g., FSVM1) that is not responsible for managing the TLD, a redirect request is sent to the client informing the client that the TLD150 may be accessed from the FSVM responsible (according to the mapping) for servicing (and managing) the TLD (e.g., FSVM2) as determined, e.g., from the location mapping table 540. The client may then send the request to access the TLD150 of the distributed share to FSVM2. Similarly, if a client connects to a particular FSVM (e.g., FSVM2) of FS 410 to access a TLD of a standard share managed by a different FSVM (e.g., FSVM1), FSVM2 sends a redirect request to the client informing the client that the TLD may be accessed from FSVM1. The client may then send the access request for the TLD to FSVM1. Notably, the mapping tables 540 may be updated (altered) according to changes in a workload pattern among the FSVMs to improve the load balance.

Data replication generally involves copying or replicating data among one or more nodes 110 of cluster 100 embodied as, e.g., a datacenter to enable continued operation of data processing operations in a multi-site data replication environment. The multi-site data replication environment may include two or more datacenters organized as, i.e., FS clusters or sites, which are typically geographically separated by relatively large distances and connected over a communication network, such as a WAN. For example, data at a local datacenter (primary FS site) may be replicated over the network to one or more remote datacenters (one or more secondary FS sites) located at geographically separated distances to ensure continuity of data processing operations, e.g., in the event of a failure of the nodes at the primary FS site.

Synchronous replication may be used to replicate the data between the FS sites such that each update to the data at the primary FS site is copied to the secondary FS site. For instance, every update (e.g., write operation) issued by a UVM 210 to data designated for replication is continuously replicated from the primary FS site to the secondary FS site before the write operation is acknowledged to the UVM. Thus, if the primary FS site fails, the secondary FS site has an exact (i.e., mirror copy) of the data at all times. Synchronous replication generally does not require the use of snapshots of the data; however, to establish a multi-site data replication environment or to facilitate recovery from, e.g., network outages in such an environment, a snapshot may be employed to establish a point-in-time, immutable reference from which the sites can (re)synchronize the data.

In the absence of continuous synchronous replication between the FS sites, the current state of the data at the secondary FS site always "lags behind" (is not synchronized with) that of the primary FS site resulting in possible data loss in the event of a failure of the primary FS site. If a specified amount of time lag in synchronization is tolerable (e.g., an hour), then asynchronous (incremental) replication may be selected between the FS sites, for example, a point-in-time image replication from the primary FS site to the secondary FS site is not more than one hour behind. Incremental replication generally involves at least two point-in-time images or snapshots of the data to be replicated, e.g., a base snapshot that is used as a reference and a current snapshot that is used to identify incremental changes to the data since the base (reference) snapshot. To facilitate efficient incremental replication in a multi-site data replication environment, a reference snapshot is required at each FS site, i.e., with the presence of a reference snapshot at each FS site, only incremental changes (deltas Δs) to the data need be sent (e.g., via incremental replication) to secondary FS site, which applies the deltas (Δs) to the reference snapshot so as to synchronize the state of the data to the time of the current snapshot at the primary FS site. Note that, in an embodiment, the data may illustratively include a workload characterized by a distributed share.

The techniques described herein employ a replication technology that asynchronously replicates high-level logical constructs (e.g., shares or files) between FSs located at geographically separated clusters or sites. In an embodiment, a high-level construct is illustratively a share (e.g., distributed share) and/or one or more portions of a distributed share (e.g., TLD or file). The replication technology may be deployed in a variety of use cases (deployments) to enhance the Files service provided by the FS sites including (i) a data distribution environment from a central primary (source) FS site to a plurality of distributed secondary (target) FS sites, (ii) a data consolidation environment from a plurality of distributed source FS sites to a central target FS site, and (iii) a peer-to-peer environment for 2-way synchronization between two FS sites.

Replication Policy Management and Scheduling

The embodiments described herein are directed to a replication policy management and scheduling technique of the Files service configured for deployment in multi-site data replication environments. Illustratively, the technique involves policy management for data (e.g., distributed share or portions thereof) distribution and/or data consolidation (concentration) where multiple source FS sites (sources) replicate the data to one central target FS site (target), e.g., in a spoke and hub arrangement typical of remote office/branch office (ROBO) environments. The technique also involves creation and configuration of a main replication policy by a customer at a central resource manager configured to interact and manage a plurality of FS sites, each of which includes one or more FSVMs.

Figure 6:
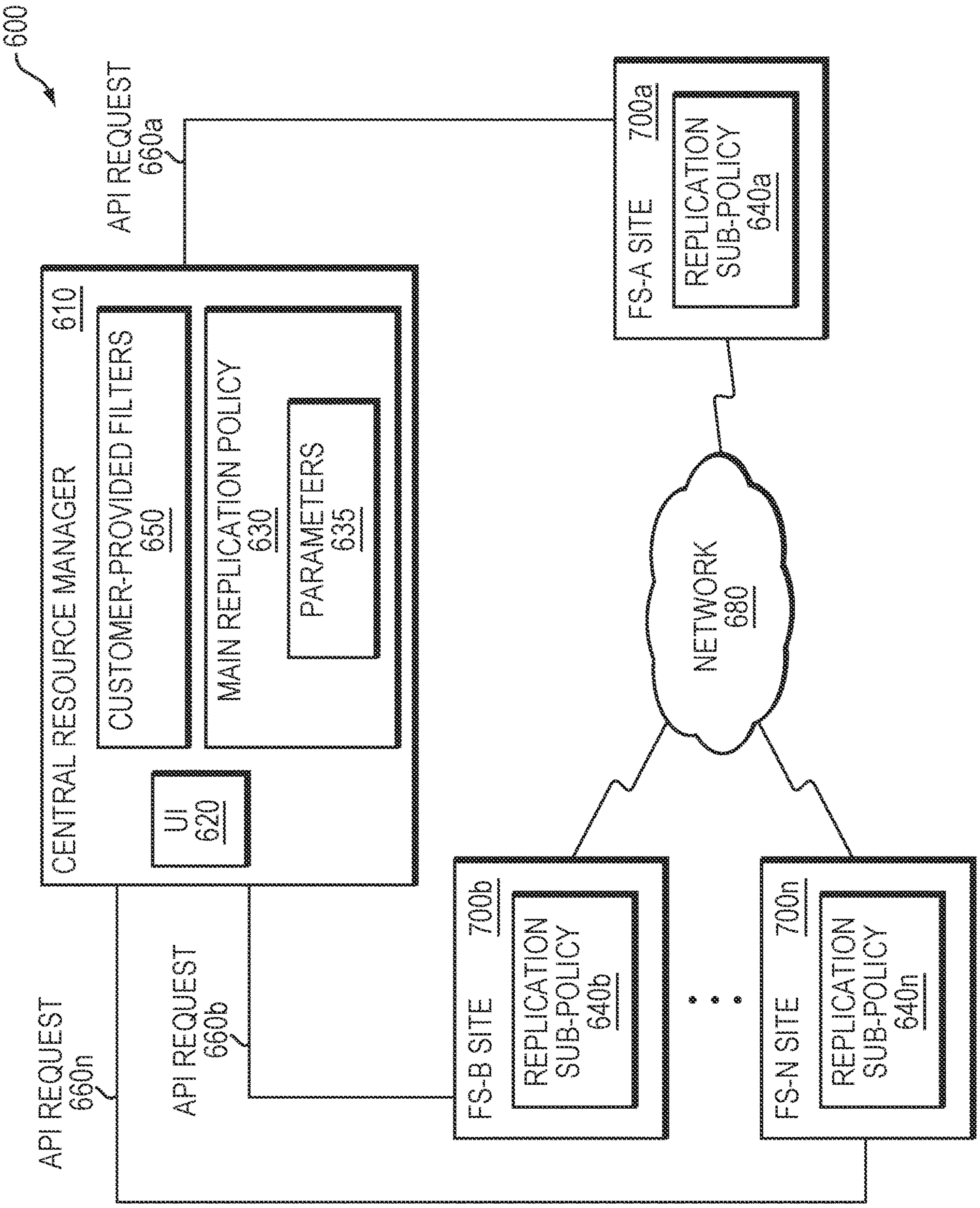
FIG. 6 is a block diagram of an exemplary data consolidation environment including a central resource manager coupled to a plurality of FS sites.

FIG. 6 is a block diagram of an exemplary data consolidation environment 600 including a central resource manager 610 coupled to a plurality of FS sites 700*a-n*. In an embodiment, the central resource manager 610 is coupled to remote FS sites 700*b-n* (FS-B through FS-N, respectively) configured to replicate data of high-level constructs (or portions thereof) to a central FS site 700*a* (FS-A). The central resource manager 610 is illustratively a software component that may run (execute) on a management VM of any node 110 of cluster 100 at the FS sites 700*a-n* to manage those sites 700*a-n* connected to a network 680 of the environment 600. The central resource manager 610 includes a user interface (UI) 620 embodied as a website that provides a "pane of glass" for a customer or administrator to create a main replication policy 630 that is translated (compiled) into a plurality of replication sub-policies 640*a-n*, each of which is provided to a FS site 700*a-n* The main replication policy 630 and sub-policies 640*a-n* collectively allow the central resource manager 610 to manage and control replication of the data between the multiple FS sites 700*a-n*.

In an embodiment, the main replication policy 630 defines data at a high-level construct (e.g., distributed home share, TLD or file) for replication from the multiple FS sites 700*b-n* (sources) to the single central FS site 700*a* (target) in accordance with customer-provided filters 650 (e.g., attributes directed to directories or files to replicated or excluded). The main replication policy 630 is translated into a plurality of replication sub-policies 640*a-n* (i.e., replication jobs pertaining to each of the FS sites 700), where each sub-policy 640 is created and managed at each source/target FS site. Each replication sub-policy 640 defines and creates storage location mappings (e.g., dataset mappings of TLDS/files on the source to corresponding TLDs/files on the target) and schedules replication jobs configured to replicate shares and/or portions of shares, e.g., TLDs and/or files, according to the dataset mappings.

Assume a customer creates and configures a main replication policy 630 via the UI 620 of the central resource manager 610. The main replication policy 630 provides parameters 635 for data replication including identification of one or more distributed shares 510 to be replicated from the sources for consolidation at the target, i.e., the main policy 630 enumerates the sources and target of the replication, as well as the share paths to storage locations of data for the distributed shares (or portions thereof) at the source (e.g., source share paths) and the target (e.g., target share paths). The parameters 635 of the main replication policy 630 also specify a type of replication to be implemented (e.g., move/migration or, illustratively, backup consolidation) and a schedule for replicating the distributed share 510. The central resource manager 610 processes and organizes the main replication policy 630 and parameters 635 for creation of replication sub-policies 640*a-n* by the sources and target FS sites. To that end, the central resource manager 610 sends policy configurations via application programming interface (API) requests 660*a-n* to the source and target FS sites to create replication sub-policies 640*a-n*, wherein the policy (sub-policy) configuration request includes an identification of the distributed share 510 and directories (e.g., TLDs 520) used for implementing a particular type of replication at a particular schedule, along with the respective source and target share paths to storage locations of the data for the distributed share (including constituent directories and files), as configured by the customer.

For example, the customer may create and configure the main replication policy 630 to replicate a particular distributed share 510 (share1) located on a source FS site (FS-B) to another distributed share 510 (share2) on the target FS site (FS-A). Share1 on the source may include many (e.g., hundreds) TLDs 520 that need to be mapped to the correct distributed "home" share on the target. The customer may be interested in replicating data from any share path level (e.g., TLD, sub-directory, file) of the distributed share 510 at the source to a corresponding path level on the target. Such path-to-path replication involves an initial synchronization to create a dataset mapping (including share path translation) of, e.g., TLDs and associated share path storage locations of the data from the source to the target. Note that additional TLDs 520 may be created subsequent to the initial synchronization, which requires dynamic mapping of the TLDs from the source to the target, i.e., dynamic mapping during replication as opposed to static mapping during policy creation. That is, policy management includes a static mapping where the customer specifies replication of a high-level construct (e.g., a distributed share 510) and a dynamic mapping where the distributed share is checked to determine whether additional directories (e.g., TLDs 520) or files are created and destined for replication.

Figure 7:
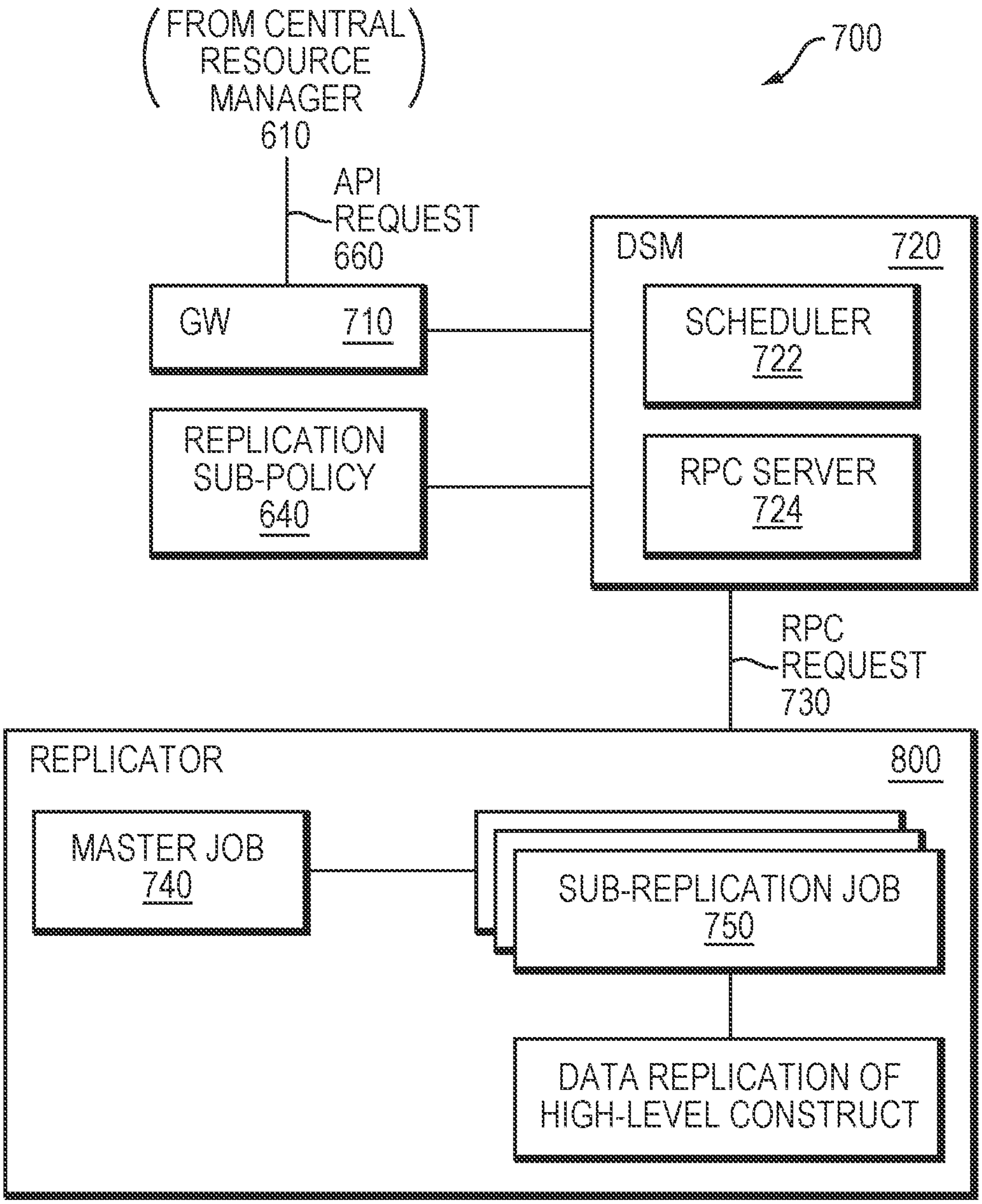
FIG. 7 is a block diagram of an exemplary FS site configured to implement a replication policy management and scheduling technique of the Files service.

FIG. 7 is a block diagram of an exemplary FS site 700 configured to implement a replication policy management and scheduling technique of the Files service. As noted, the central resource manager 610 provides policy configuration to each FS site 700*a-n* via one or more API requests 660, e.g., embodied as Representational State Transfer (REST) API calls, to a gateway (GW) 710 running on a node of each FS site 700. Each GW 710 is configured to handle the REST API calls by, e.g., communicating and interacting with a distributed service manager (DSM) 720 of FSVM 270 running on each node 110 of each site 700. The DSM 720 is responsible for file service interactions and initial configurations of replication services provided by the FSVMs 270 of each FS 410 including policy (sub-policy) create, get, update, and delete functions. The DSM 720 includes a general-purpose scheduler 722 (e.g., application or process) configured to maintain and schedule jobs (e.g., function calls) at intervals or specific times/dates. The scheduler 722 interacts with a remote procedure call (RPC) server 724 (e.g., application or process) configured to serve RPC requests 730 to manage replication polices (e.g., sub-policies 640), configurations and schedules. Each replication sub-policy 640 is illustratively implemented as one or more jobs, wherein the scheduler 722 is responsible for periodically (e.g., every 10 minutes) scheduling a job that is picked up by (allocated to) a replicator process (replicator) 800 running on each node of each FS site 700. Once a schedule is triggered, the scheduler 722 and RPC server 724 cooperate to send an RPC request 730 to the replicator 800 that includes information such as source share path and target site details including target share path. The scheduled jobs for implementing the replication sub-policies may execute partially or wholly concurrently among different FSVMs.

Operationally, the replicator 800 creates a master job 740 for a distributed home share 510 that includes multiple datasets (TLDs 520) "stitched" together to create the single namespace 550. The master job 740 is invoked (per replication sub-policy 640) to translate (compile) a source share path into one or more datasets managed by the respective FSVM 270. As noted, each FSVM1-3 is responsible for managing a portion (e.g., 100 TLDs) of the single namespace (e.g., 300 TLDs). At each FSVM, the 100 TLDs are apportioned into multiple (e.g., 5) file systems or VGs 230, such that each VG 230 is used to replicate 20 TLDs 520. Thus, 15 VGs may be employed to replicate the entire namespace of 300 TLDs, wherein each VG replicates a dataset of 20 TLDs. A single distributed home share namespace 550 is illustratively presented from 15 VGs such that, for a FS including 3 FSVMs, each FSVM is responsible for managing 5 VGs to enable flexibility for load balancing or moving/migrating VGs among FSVMs.

In an embodiment, the TLDs 520 of a distributed home share 510 are distributed at two (2) levels of concurrent replication: the FSVM level and the dataset level, such that one or more sub-jobs (sub-replication jobs 750) is used to replicate the data contents (e.g., TLDs 520) of the distributed home share 510. For example, the master job 740 may initially instruct replication of the distributed home share 510 apportioned into TLDs 520 mapped to each FSVM (FSVM level), e.g., 3 FSVMs translate to 3 FSVM sub-jobs, where each FSVM manages 100 TLDs. A next level (dataset level) of job replication involves creation of one or more additional sub-replication jobs 750 for each of the 5 data sets managed by the FSVM (e.g., 20 TLDs per dataset). As described further herein, the datasets are apportioned into chunks and concurrently replicated from the source FS site 700*b-n* to the target FS site 700*a*.

In an embodiment, replication of TLDs 520 of a distributed home share 510 between source and target FS sites 700*a-n* involves a location mapping that specifies. e.g., 15 VGs from the source FS site that maps to 15 VGs at the target VG. Different mapping combinations are possible, such as TLD1 of VG1 at source FS site (e.g., FS-B) replicates to TLD1 of VG10 at target FS site (e.g., FS-A). Illustratively, the location mapping is generated (e.g., at the source and target FS sites) and embodied as mapping table 540 before job commencement/start. The generated mapping at the source FS site specifies the locations of the TLDs to be replicated from the source FS site, e.g., TLDs 1-20 are located on VG1, TLDs 21-40 are located on VG2, etc. Likewise, the generated mapping at the target FS site specifies the locations of the TLDs replicated to the target FS site, e.g., TLD1 is located on VG10, etc.

As noted, a distributed cache 530 of each FSVM 270 maintains one or more location mapping tables 540 specifying mapping locations (i.e., associating nodes having the VGs with the TLDs) of all of the TLDs 520 of the distributed home share 510. In an embodiment, the location mapping tables 540 may be embodied as respective source and target mapping tables 540 specifying the mapping locations of TLD to VG at the source FS and target FS, respectively. In this manner, the source and target may have different distributions of the TLDs to VGs to support, e.g., differing directory organizations and concentration/expansion of data to fewer/more volume groups. Accordingly, the mapping tables 540 may be examined and used to "smart" synchronize replication of a portion, e.g., TLD1, of the distributed home share from VG1 on the source FS site 700*b-n* to VG10 on the target FS site 700*a*. For example, the scheduler 722 at the source FS site may use the source mapping table 540 to schedule a sub-replication job 750 on the replicator 800 for data replication of a construct, e.g., TLD1, on VG1 to TLD1 on VG10 of the target FS site.

Asynchronous Replication via File-Oriented Snapshots

The embodiments described herein are also directed to a technique configured to enable asynchronous replication of a high-level construct (e.g., distributed home share, top level directory (TLD) or file) via file-oriented snapshots driven by incremental block-level snapshot changes. Asynchronous replication for incremental snapshots is based on file system level (vs block level) snapshots of the high-level construct that are generated using change file tracking from block-level snapshot differences (deltas) and screened by customer-provided filters. Illustratively, the customer-provided filters are file-oriented (e.g., pathname) filters denoted according to some syntax and grammar (e.g., as regular expressions) so as to include/exclude files and/or directories. File/directory (TLD) changes are dynamically mapped and executed by incremental replication jobs. The technique also involves creation and maintenance of a replay list for files failing replication where the failed files may be replicated during a next incremental replication cycle of periodically scheduled incremental replication jobs.

In an embodiment, the DSM 720 and replicator 800 cooperate to perform asynchronous replication of the high-level construct, e.g., a distributed share 510. The DSM 720 and replicator 800 run on a node 110 local to each source FS site 700*b,c* and/or target FS site 700*a* and, thus, can access the location mapping table 540 cached at each FS site 700 to efficiently synchronize replication of the distributed share 510. The replicator 800 is responsible for data replication from each of the multiple source FS sites 700*b-c* to a central target FS site 700*a* as defined by the main replication policy 630. To that end, the replicator 800 manages replication jobs of the distributed share, divides directories/files of the distributed share into parallel streams based on criteria of dataset mapping from the source FS sites to the target FS site, replicates data of the high-level construct (e.g., directories and/or files) using concurrent replication threads, and tracks progress of the replication.

In one or more embodiments, a write operation issued to FSVM 270, on a source (local) FS site and directed to the distributed share 510 of the namespace 550 is acknowledged to the client, e.g., UMV 210 and replication of the distributed share 510 to the target (remote) FS site occurs asynchronously. Illustratively, a base snapshot of the distributed share data (e.g., TLDs 520) is generated at the source FS site and all of the share data of the base snapshot is asynchronously replicated to establish an initial full replication of the distributed share 510 at the target FS site. Asynchronous replication of the base snapshot is used for initial seeding to ensure replication and synchronization of the file system hierarchy at the sites. In addition, the base snapshot may be employed to establish a point-in-time, immutable reference snapshot from which the sites can (re)synchronize the data of the file system hierarchy using incremental replication. During a next replication cycle, a subsequent (current) snapshot of the distributed share data is generated and compared with the base snapshot to identify incremental changes or deltas to the data since the base (reference) snapshot. According to the technique, the replicator 800 is configured to employ the block-level snapshot deltas to drive directory/file level changes for replication based on the customer-provided filters 650 at the file system level.

Figure 8A:
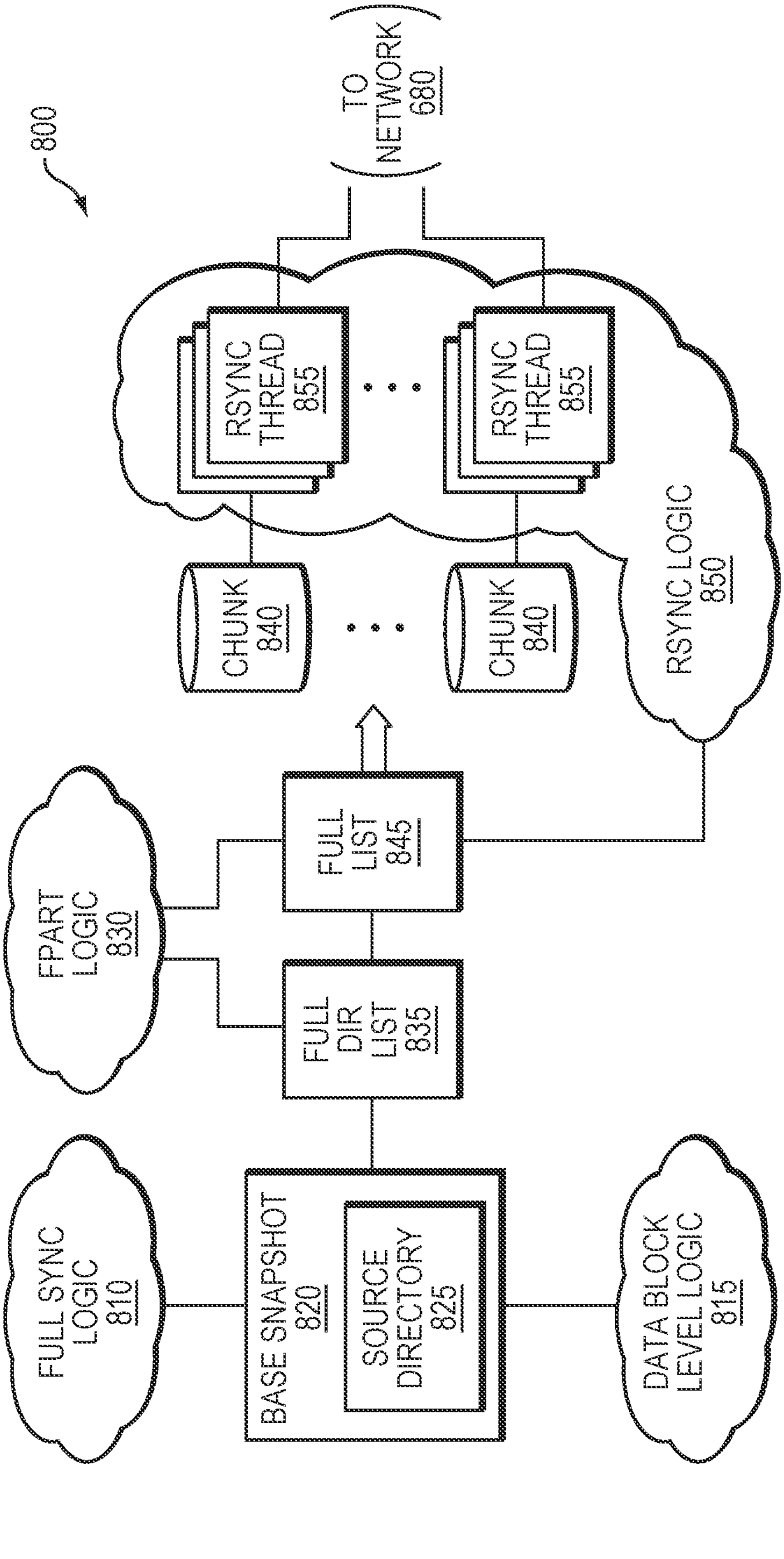
FIG. 8A is a block diagram of replicator configured to implement data replication of the Files service in accordance with an embodiment of a high-level construct asynchronous replication technique.

FIG. 8A is a block diagram of the replicator 800 configured to implement data replication of the Files service in accordance with an embodiment of a high-level construct asynchronous replication technique. A full synchronous snapshot process ("full sync logic") 810 of the replicator 800 cooperates with a data plane service (e.g., data I/O manager 330) of the CVM 300 executing on a node 110 of the source FS site 700*b-c* to generate a full base snapshot 820 of the distributed share 510 mounted within a source share path to be replicated. Notably, the initially generated full base snapshot 820 of the distributed share 510 is a file system-level snapshot illustratively embodied as a high-level construct that employs metadata, e.g., stored in inodes, of the virtualized file system (e.g., metadata related to modification timestamps of files, file length and the like) to preserve the file system hierarchy during snapshot generation. A data block level process ("data block level logic 815") underlying snapshot generation may also be employed in association with the file system metadata to preserve the logical construct (e.g., file system) hierarchy.

The full sync logic 810 scans a TLD ("source directory 825") from the base snapshot 820 and reads all of the data from the snapshot to feed a full list of all directories and files, e.g., full directory (DIR) list 835 of local files. Illustratively, the full sync logic 810 at the source FS site 700*b-c* creates the full DIR list 835 using, e.g., directory/file subtree traversal for each TLD 520 configured for replication in a respective replication sub-policy 640. The replicator 800 then invokes a file partitioning process ("fpart logic 830") to sort the full DIR list 835 and generate a file list 845 based on the mapping locations of the share/dataset at the target FS site 700*a* and a respective count of jobs is created. The fpart logic 830 thereafter cooperates with a remote synchronization process ("rsync logic 850") to span the data of the file list 845 across different parallel rsync threads 855 by partitioning (spliting) the data into predetermined chunks 840, e.g., via sub-replication jobs 750. The parallel rsync threads 855 of the rsync logic 850 are then executed to copy (replicate) the chunks 840 over the network 680 to a remote rsync daemon of the rsync logic 850 configured to run on the remote target FS site 700*a*.

Incremental File Level Replication

An aspect of the high-level construct asynchronous replication technique involves determining differences (deltas) during asynchronous incremental replication using modified change file tracking (CFT) technology embodied as modified CFT logic. Illustratively, the modified CFT logic is used by the replicator 800 at the FS site to efficiently compute deltas at a high-level logical construct (e.g., share, directory, or file level) by determining which directories or files (e.g., inodes) have changed since the last replication without having to needlessly scan or compare actual file data. A subsequent file-system level snapshot of the distributed share is (periodically) generated at the source FS site by, e.g., the full sync logic 810 in cooperation with the data I/O manager 330 of the CVM 300 and data block level logic 815. The modified CFT logic scans the base and subsequent snapshots using a hierarchical construct level compare to determine and compute data block changes or deltas of the files (and/or directories) between the base and subsequent file-system level snapshots driven (pruned) according to the determined/detected changed inodes (directories/files), which changes are embodied as one or more incremental snapshots. Further, such changed directories/files (inodes) may be propagated (i.e., re-used) among the replication jobs for each source share. For example, assume there are "N" share paths configured from the same source share (at a same interval) resulting in "N" master jobs created per share path. The delta calculated for the source share and applied to a master job may be re-used by the other master jobs and sub-jobs, which may be further pruned according to directory path. Specifically, the modified CFT logic 870 (see below), e.g., employed by the master job, compares the snapshots searching for changes to the inodes (altered inodes resulting from, e.g., metadata changes related to modification of timestamps of files, file length and the like) corresponding to changed files and associates the snapshot changes (deltas) with blocks of changed files. That is, the CFT logic determines changed blocks containing inodes to identify changed files and associates actual changed blocks of data within those files via traversal of the file blocks using the altered inodes (directory entries). In this manner, a list of modified files 865 (see below) corresponding to the changed blocks is created without traversing (walk through) directories examining/searching unchanged directories and files in the file system. Notably, the use of the modified CFT logic to determine changed files eliminates the need to perform a recursive directory walk through to scan all directories to determine/detect which files have changed. The customer may choose to replicate the distributed share at either the directory or file level; however, the replicator operates at the file level, i.e., entire changed files as well as directories having changed files may be replicated as incremental snapshots from the source FS site to the target FS site.

Figure 8B:
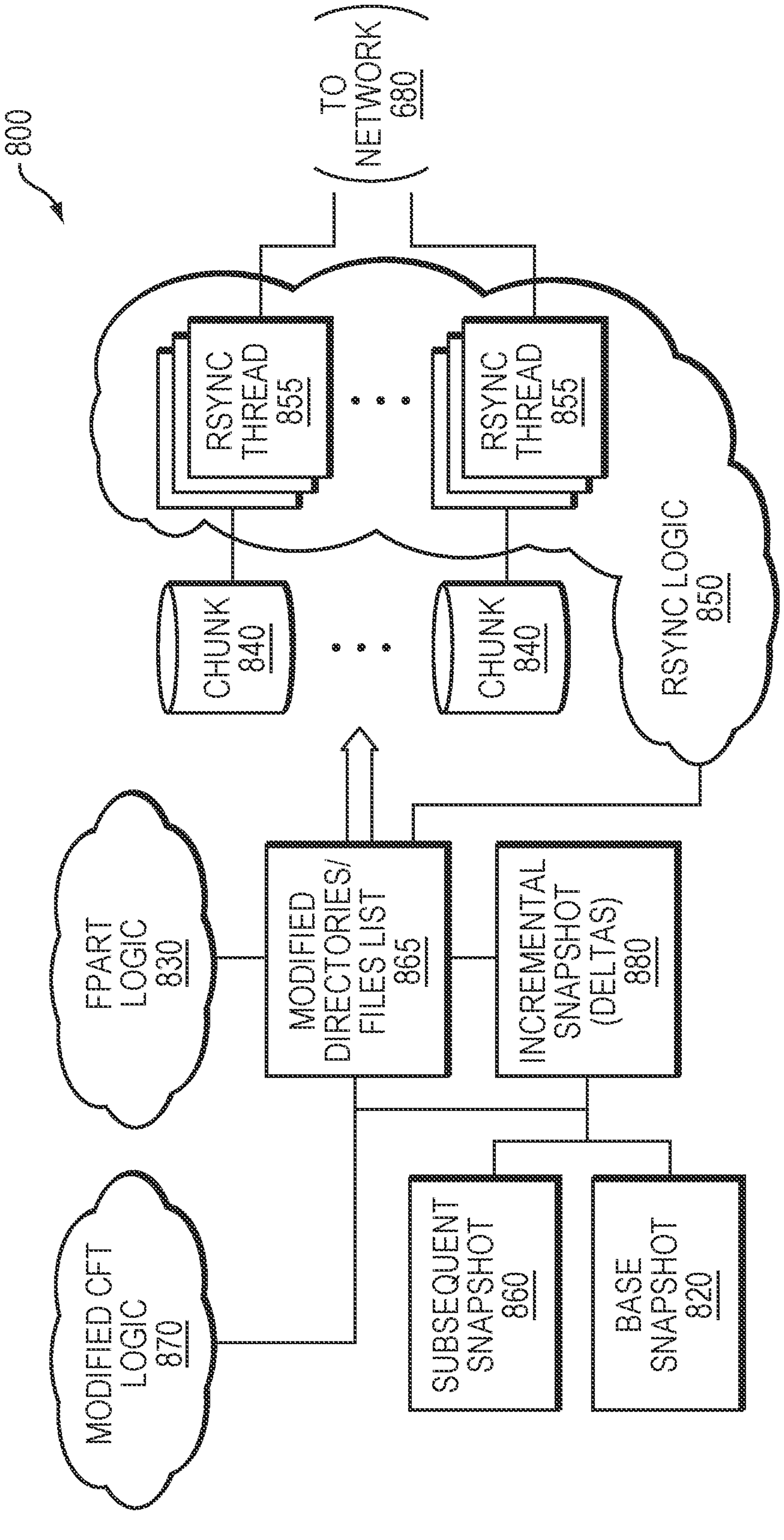
FIG. 8B is a block diagram of the replicator configured to implement data replication of the Files service in accordance with another embodiment of the high-level construct asynchronous replication technique.

FIG. 8B is a block diagram of the replicator 800 configured to implement data replication of the Files service in accordance with another embodiment of the high-level construct asynchronous replication technique. A subsequent file-system level snapshot 860 of the distributed share 510 is generated and the replicator 800 computes differences (deltas) between the initial base snapshot 820 and subsequent snapshot 860 as incremental snapshot 880 using the modified CFT logic 870 at the source FS site. Notably, the differences or deltas computed by the modified CFT logic 870 are at a higher logical level (e.g., determining changed directories and/or files) than changes computed by a change block tracking (CBT) process at a lower level (e.g., data blocks) that identifies only changed blocks. In an embodiment, the CBT process may be subsumed within data block level logic 815 to determine lower level (e.g., data block) changes that are used to inform the higher logical level (e.g., associating data block changes with directories/files) deltas used by the incremental snapshot 880.

According to the technique, the modified CFT logic 870 detects the directories and/or files of, e.g., TLDs 520 of the distributed share 510 that are changed (modified) between the base snapshot 820 and subsequent snapshot 860, i.e., since the last replication, to generate the incremental snapshot 880. The modified CFT logic 870 then computes a list of changed directories and/or files ("modified directories/files list 865") that is employed during incremental replication to replicate the data corresponding to the differences (diffs) or deltas of the incremental snapshot 880 to the target FS site. Use of modified CFT logic 870 for asynchronous incremental replication is substantially efficient and flexible, e.g., to perform incremental replication of a distributed home share (300 TLDs), the CFT logic 870 computes the deltas (diffs) of the VGs 230 for the TLDs 520 and replicates only the changed files of the TLDs and/or changed subdirectories of the TLDs, as specified by the replication sub-policy 640 executed at the source FS site 700$b$-$n$ and optionally as pruned/screened according to the customer-provided filters 650.

Thereafter, the fpart logic 830 is invoked to facilitate partitioning of the distributed share data (deltas) to enable concurrent replication workflow processing. Illustratively, for subsequent incremental replication, the modified directories/files list 865 is passed to the fpart logic 830, which cooperates with the rsync logic 850 to span the data of the sorted modified directories/files list 865 across different parallel rsync threads 855 by splitting the data into predetermined chunks 840, e.g., via sub-replication jobs 750. The parallel rsync threads 855 of the rsync logic 860 are then executed to copy (replicate) the chunks 840 over the network 680 to a remote rsync daemon of the rsync logic 850 configured to run on the remote target FS site 700$a$.

In an embodiment, incremental replication using the subsequent snapshot 860 to generate the incremental snapshot 880 begins on a schedule defined in the replication sub-policy 640 and replicates all changes or deltas since the last successful data sub-replication job 750. Since the replication sub-policy 640 is share path-based, incremental replication may have additional directories added or configured at any time. The newly added directories may need full replication for respective subtrees. Accordingly, each replication cycle may be combination of full and incremental replication modes.

Another aspect of the high-level construct asynchronous replication technique is the ability to determine and select which directories to replicate, as well as which files within a directory to replicate. Illustratively, the asynchronous replication technique described herein operates on a copy-on-write file system where new data blocks are created for data changes from a previous snapshot. The changed blocks are mapped to their respective files (i.e., changed files) and directories to create a data structure, e.g., the modified directories/files list 865. Customer-provided filters 650 may be applied to the modified directories/files list 865 to (i) mark the directories to which the modified (changed) files belong (i.e., to be included in the replication) and (ii) eliminate (prune) types of files to be excluded from replication. Note that if the changed files do not belong to higher-level constructs (e.g., TLDs or directories) destined for replication, then those changed files may be pruned, i.e., removed prior to replication so that those files are not replicated even if they correspond to changed data blocks. Note also that the customer may specify types of files to be excluded from replication, e.g., files containing confidential or personal identifiable information. The remaining filtered (i.e., passing the filter) and changed files are then chunked and replicated over the resync threads 855 to the target FS site. Essentially, the incremental replication aspect of the high-level construct asynchronous replication technique involves (i) diffing snapshots at the data block level, (ii) mapping changed data blocks to respective files, and (iii) applying filters to the respective files to determine those files that are associated with the directories to be replicated (as specified by a replication sub-policy) and those files to be excluded. Notably, the filters are provided by the customer (customer preference) and denoted by pathname according to some syntax and grammar (e.g., regular expressions) and included within the main replication policy and sub-policies.

While there has been shown and described illustrative embodiments for (i) replication policy management and scheduling of a Files service deployed in multi-site data replication environments, as well as (ii) asynchronous replication of high-level constructs via file-oriented snapshots driven by incremental block-level snapshot changes, it is to be understood that various other adaptations and modifications may be made within the spirit and scope of the embodiments described herein. For example, the replication policy management and scheduling technique of the Files service illustratively described herein includes a main replication policy that defines data at a high-level construct (e.g., distributed home share. TLD or file) for replication from the multiple FS sites (source sites) to the single central FS site (target site) in accordance with customer-provided filters (e.g., attributes directed to directories or files to replicated or excluded). However, the technique further contemplates replicating data at the high-level construct from one or more target sites to one or more source sites in accordance with a data distribution environment (e.g., from a central source FS site to a plurality of distributed target FS sites) and a peer-to-peer environment (e.g., for 2-way synchronization between two FS sites). For these embodiments, the main replication policy is translated into a plurality of replication sub-policies (i.e., replication jobs pertaining to each of the FS sites), where each sub-policy is created, managed, and executed at each source/target FS site. Each replication sub-policy defines and creates storage location mappings and schedules replication jobs configured to replicate shares and/or portions of shares, e.g., TLDs and/or files, according to the dataset mappings.

The techniques also contemplate maintenance of a special "replay" list in the event certain modified high-level constructs (e.g., directories and/or files) fail to replicate from one or more previous replication cycles. During a next replication cycle, the modified constructs (files) on the replay list are provided to the replicator 800 and replicated along with the modified files of a current replication job. Illustratively, the replay list is embodied as a running list wherein the modified files from every previously failed (or partially failed) replication job are picked up and included in (i.e., appended to) the next replication job, which replicates the current changed files along with the previous job's replay list of files. In this manner, the replay list may be continued from replication job to replication job until successfully replicated.

The foregoing description has been directed to specific embodiments. It will be apparent, however, that other variations and modifications may be made to the described embodiments, with the attainment of some or all of their advantages. For instance, it is expressly contemplated that the components, logic, and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

generating a base snapshot of a distributed share used to replicate data from a source file system (FS) site over a network to a target FS site, wherein the base snapshot is a file system-level snapshot and wherein the distributed share includes one or more top-level directories (TLDs);

creating dataset mappings of the TLDs as path-to-path share path translations from the source FS site to the target FS site;

generating one or more subsequent file-system level snapshots of the distributed share at the source FS site;

scanning a source directory from the base snapshot at the source FS site to generate a list of changed files of the TLDs partitioned according to differing dataset mappings by target FS site; and replicating the data corresponding to deltas of the changed files to the target FS site divided into parallel streams based on the partitioned list of changed files, wherein the dataset mappings are dynamically modified during the replication when one or more additional TLDs are created and destined for replication.

2. The method of claim 1, wherein the replication is a combination of incremental replication and full replication modes when the one or more TLDs are created and destined for replication.

3. The method of claim 1, wherein replicating further comprises spanning the data across parallel synchronization threads of the source FS site by partitioning the data into predetermined chunks.

4. The method of claim 1, further comprising reusing the deltas to replicate the data across parallel synchronization threads from a portion of the source FS site over the network to another target FS site.

5. The method of claim 1, wherein the replication of the data corresponding to the deltas of the changed files to the target ES site further comprises scheduling one or more jobs to perform the replication according to the partitioning of the changed files list.

6. The method of claim 1, wherein replicating the data corresponding to the deltas of the changed files is screened by a file-oriented pathname filter.

7. The method of claim 1, further comprising computing a modified directories/files list employed during incremental replication to replicate the data corresponding to the deltas of the changed files.

8. The method of claim 7, further comprising applying customer-provided filters to the modified directories/files list to (i) mark directories to which the changed files belong and (ii) eliminate types of files excluded from replication.

9. The method of claim 1, further comprising maintaining a replay list for files failing replication, wherein the failed files are replicated during a subsequent replication cycle.

10. The method of claim 1, further comprising maintaining a replay list for files failing replication, wherein the failed files are replicated during a subsequent replication cycle without requiring re-computation of the deltas.

11. The method of claim 1, further comprising performing a hierarchical construct level compare between the base and subsequent snapshots to identify altered inodes resulting from metadata spread across the distributed share that correspond to one or more changed files.

12. A non-transitory computer readable medium including program instructions for execution on a processor, the program instructions configured to:

generate a base snapshot of a distributed share used to replicate data from a source file system (FS) site over a network to a target FS site, wherein the base snapshot is a file system-level and wherein the distributed share includes one or more top-level directories (TLDs);

create dataset mappings of the TLDs as path-to-path share path translations from the source FS site to the target FS site;

generate one or more subsequent file-system level snapshots of the distributed share at the source FS site;

scan a source directory from the base snapshot at the source ES site to generate a list of changed files of the TLDs partitioned according to differing mapping locations at the target FS site from the source FS site; and replicate the data corresponding to deltas of the changed files to the target FS site divided into parallel streams based on the partitioned list of changed files, wherein the dataset mappings are dynamically modified during the replication when additional TLDs are created and destined for replication.

13. The non-transitory computer readable medium of claim 12, wherein the replication is a combination of incremental replication and full replication modes when the one or more TLDs are created and destined for replication.

14. The non-transitory computer readable medium of claim 12, wherein the program instructions configured to replicate are further configured to span the data across parallel synchronization threads of the source FS site by partitioning the data into predetermined chunks.

15. The non-transitory computer readable medium of claim 12, wherein the program instructions are further configured to reuse the deltas to replicate the data across parallel synchronization threads from a portion of the source FS site over the network to the remote target FS site.

16. The non-transitory computer readable medium of claim 12, wherein the program instructions to replicate the data corresponding to the deltas of the changed files to the target site FS are further configured to schedule one or more jobs to perform the replication according to the partitioning of the changed files list.

17. The non-transitory computer readable medium of claim 12, wherein the program instructions configured to replicate the data corresponding to the deltas of the changed files are further configured to screen the replicated data by a file-oriented pathname filter.

18. The non-transitory computer readable medium of claim 12, wherein the program instructions are further configured to compute a modified directories/files list employed during incremental replication to replicate the data corresponding to the deltas of the changed files.

19. The non-transitory computer readable medium of claim 18, wherein the program instructions are further configured to apply customer-provided filters to the modified directories/files list to (i) mark directories to which the changed files belong and (ii) eliminate types of files excluded from replication.

20. The non-transitory computer readable medium of claim 12, wherein the program instructions are further configured to maintain a replay list for files failing replication, wherein the failed files are replicated during a subsequent replication cycle.

21. The non-transitory computer readable medium of claim 12, wherein the program instructions are further configured to maintain a replay list for files failing replication, wherein the failed files are replicated during a subsequent replication cycle without requiring re-computation of the deltas.

22. The non-transitory computer readable medium of claim 12, wherein the program instructions are further configured to perform a hierarchical construct level compare between the base and subsequent snapshots to identify altered inodes resulting from metadata spread across the distributed share that correspond to one or more changed files.

23. An apparatus comprising:
- a network connecting one or more nodes of source file system (FS) sites to one or more target FS sites, each node having a processor configured to execute program instructions to:
  - generate a base snapshot of a distributed share spread across storage resources of the network and used to replicate data from a source FS site over the network to a target FS site, wherein the base snapshot is a file system-level snapshot and wherein the distributed share includes one or more top-level directories (TLDs);
  - create dataset mappings as path-to-path share path translations from the source FS site to the target FS site;
  - generate one or more subsequent file-system level snapshots of the distributed share at the source FS site;
  - scan a source directory from the base snapshot at the source FS site to generate a list of changed files of the TLDs partitioned according to differing dataset mappings by target FS site; and
  - replicate the data corresponding to the deltas of the changed files to the target FS site divided into parallel streams based on the partitioned list of changed files, wherein the dataset mappings are dynamically modified during the replication when additional TLDs are created and destined for replication.

24. The apparatus of claim 23, wherein the replication is a combination of incremental replication and full replication modes when the one or more TLDs are created and destined for replication.

25. The apparatus of claim 23, wherein the processor configured to execute program instructions to replicate is further configured to execute program instructions to span the data across parallel synchronization threads of the source FS site by partitioning the data into predetermined chunks.

26. The apparatus of claim 23, wherein the processor is further configured to execute program instructions to reuse the deltas to replicate the data across parallel synchronization threads from a portion of the source FS site over the remote target FS site.

27. The apparatus of claim 23, wherein the processor configured to execute program instructions to replicate the data corresponding to the deltas of the changed files to the target FS site is further configured to execute program instructions to schedule one or more jobs to perform the replication according to the partitioning of the changed files list.

28. The apparatus of claim 23, wherein the processor configured to execute program instructions to replicate the data corresponding to the deltas of the changed files is further configured to execute program instructions to screen the replicated data by a file-oriented pathname filter.

29. The apparatus of claim 23, wherein the processor is further configured to execute program instructions to compute a modified directories/files list employed during incremental replication to replicate the data corresponding to the deltas of the changed files.

30. The apparatus of claim 29, wherein the processor is further configured to execute program instructions to apply customer-provided filters to the modified directories/files list to (i) mark directories to which the changed files belong and (ii) eliminate types of files excluded from replication.

31. The apparatus of claim 23, wherein the processor configured to execute program instructions is further configured to maintain a replay list for files failing replication, wherein the failed files are replicated during a subsequent replication cycle.

32. The apparatus of claim 23, wherein the processor configured to execute program instructions is further configured to maintain a replay list for files failing replication, wherein the failed files are replicated during a subsequent replication cycle without requiring re-computation of the deltas.

33. The apparatus of claim 23, wherein the processor configured to execute program instructions is further configured to perform a hierarchical construct level compare between the base and subsequent snapshots to identify altered inodes resulting from metadata spread across the distributed share that correspond to one or more changed files.

* * * * *